United States Patent [19]
Naganawa et al.

[11] Patent Number: 5,618,098
[45] Date of Patent: Apr. 8, 1997

[54] HEADLAMP FOR VEHICLE

[75] Inventors: Masahito Naganawa; Shinji Karasawa, both of Shizuoka, Japan

[73] Assignee: Koito Manufacturing Co., Ltd., Tokyo, Japan

[21] Appl. No.: 529,056

[22] Filed: Sep. 15, 1995

[30] Foreign Application Priority Data

Sep. 28, 1994 [JP] Japan .................................. 6-257260

[51] Int. Cl.$^6$ ...................................... B60Q 1/02
[52] U.S. Cl. .......................... 362/61; 362/267; 362/310; 362/369
[58] Field of Search ...................... 362/310, 390, 362/369, 61, 82, 368, 267

[56] References Cited

U.S. PATENT DOCUMENTS

| | | | |
|---|---|---|---|
| 2,999,924 | 9/1961 | Mottier et al. | 362/61 |
| 4,422,136 | 12/1983 | Newman et al. | 362/61 |
| 4,489,367 | 12/1984 | Herron et al. | 362/369 |
| 4,532,578 | 7/1985 | Gaden et al. | 362/368 |
| 5,072,348 | 12/1991 | Tsukada | 362/61 |

Primary Examiner—Ira S. Lazarus
Assistant Examiner—Sara Sachie Raab
Attorney, Agent, or Firm—Morgan, Lewis and Bockius LLP

[57] ABSTRACT

A headlamp for a vehicle includes: a lamp unit including a reflector having a front opening, a lens covering the front opening of the reflector, and a light source bulb disposed within the shell formed with the reflector and the lens; and a lamp body supporting the lamp unit therein, the lamp body including an inward projecting portion, wherein the lamp unit abuts on the inward projection portion.

8 Claims, 8 Drawing Sheets

HEADLAMP FOR VEHICLE

BACKGROUND OF THE INVENTION

1. Field of the Invention

The present invention relates to a headlamp for motor vehicles.

2. Description of the Related Art

Figure 1:
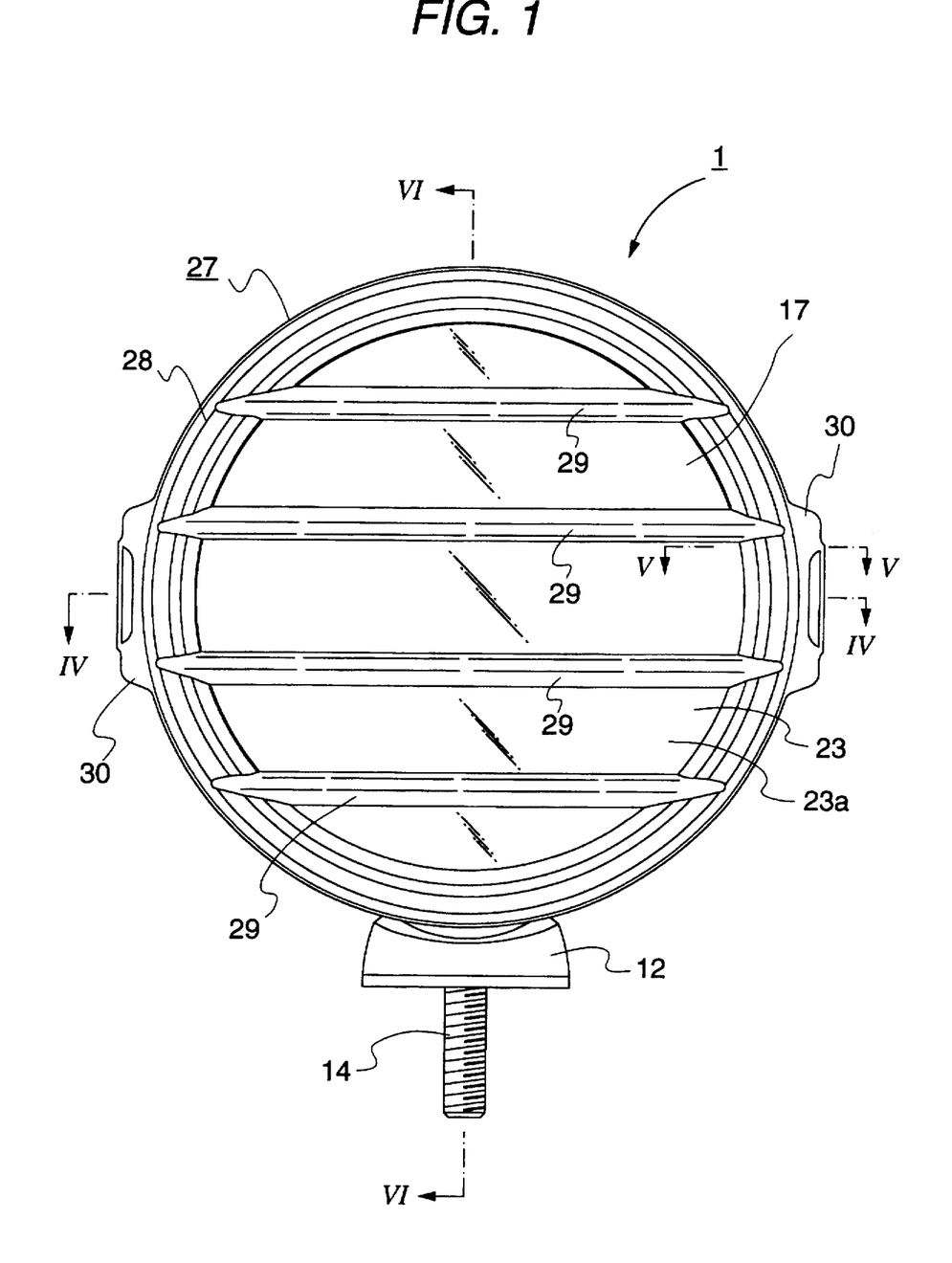
FIG. 1 shows a headlamp for motor vehicles according to the present invention, cooperating with FIGS. 2 to 7, the headlamp being described in the form of a spot lamp in the embodiment.
Figure 2:
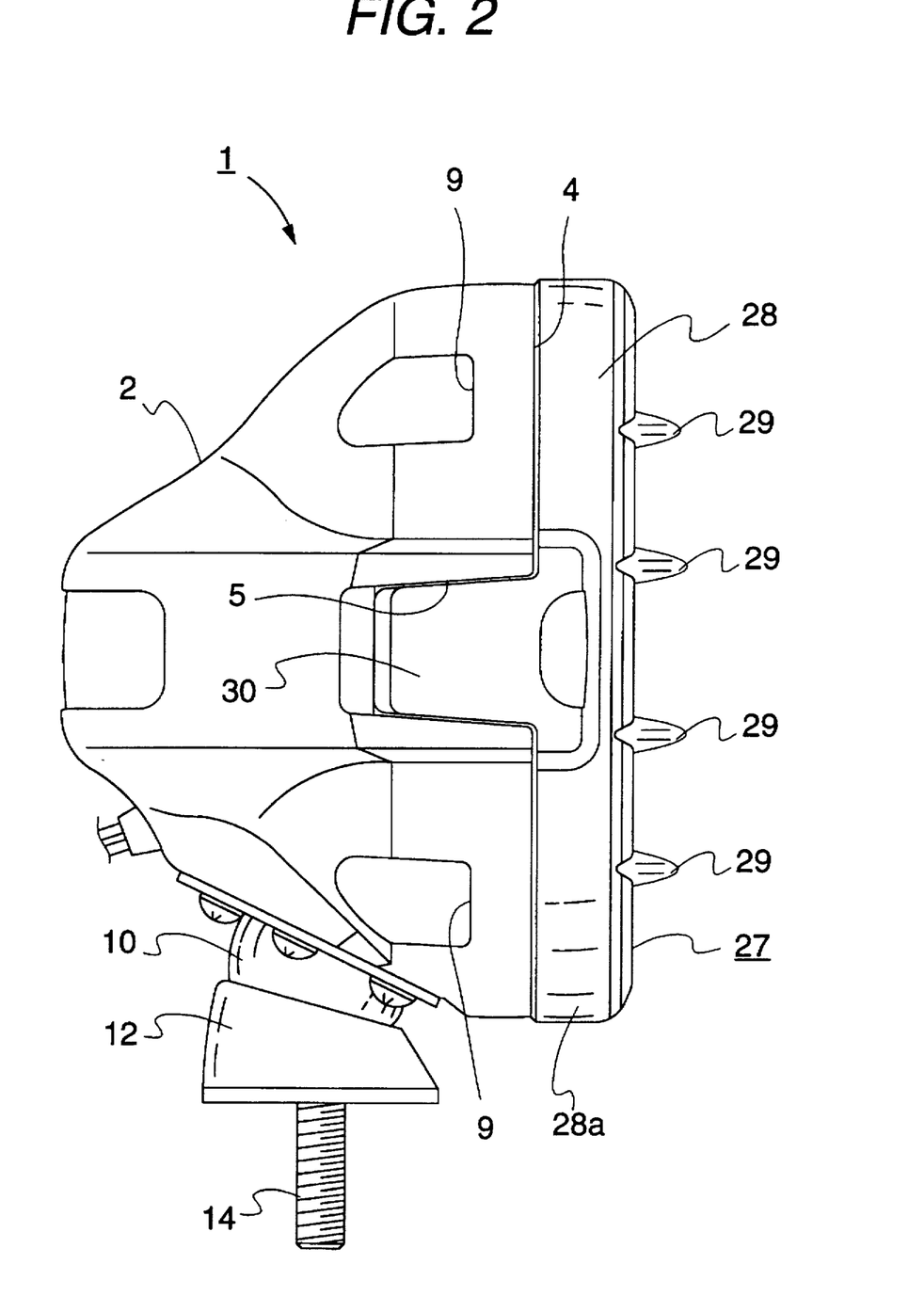
FIG. 2 is a side view showing the spot lamp.
Figure 3:
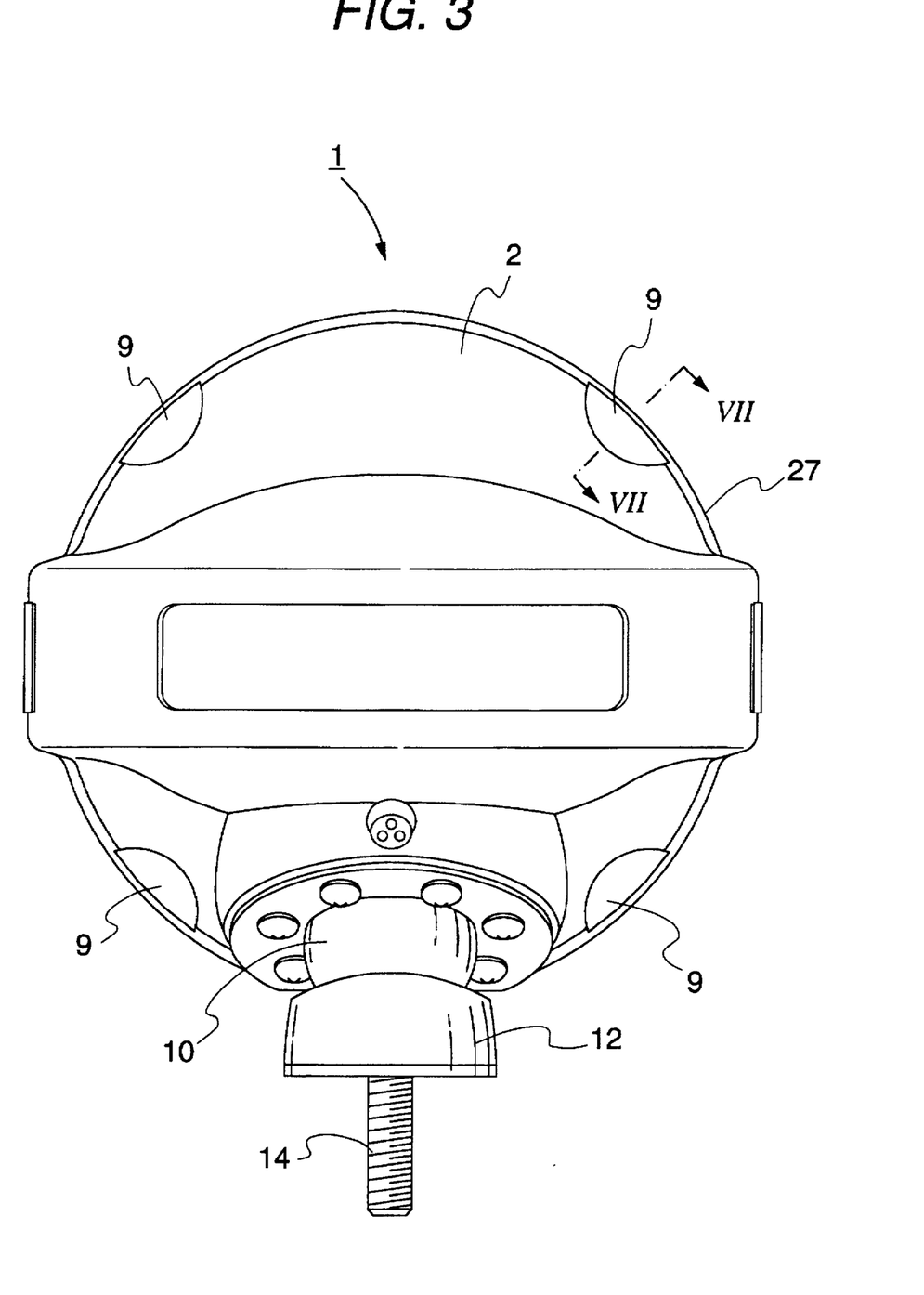
FIG. 3 is a rear view showing the spot lamp.
Figure 4:
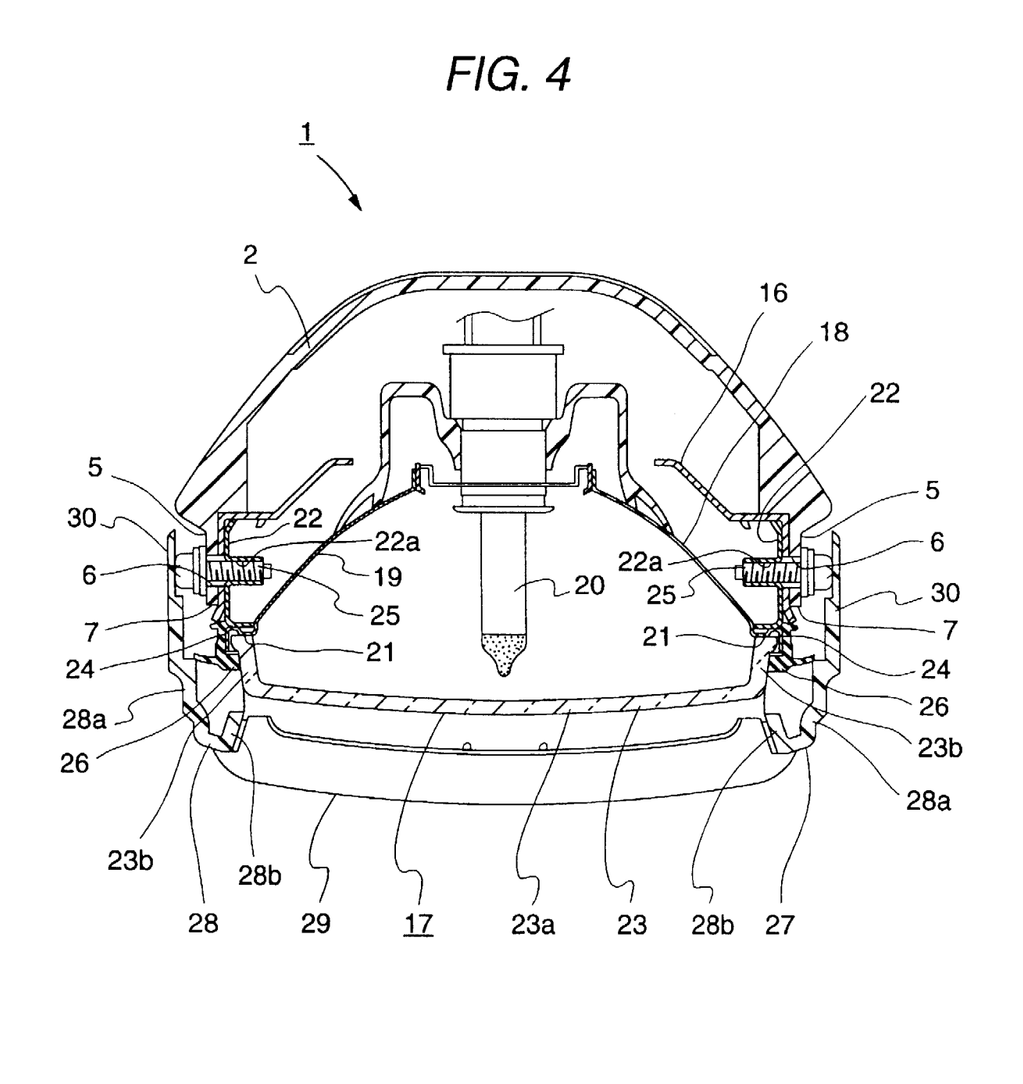
FIG. 4 is a sectional view taken on line IV—IV in FIG. 1.
Figure 5:
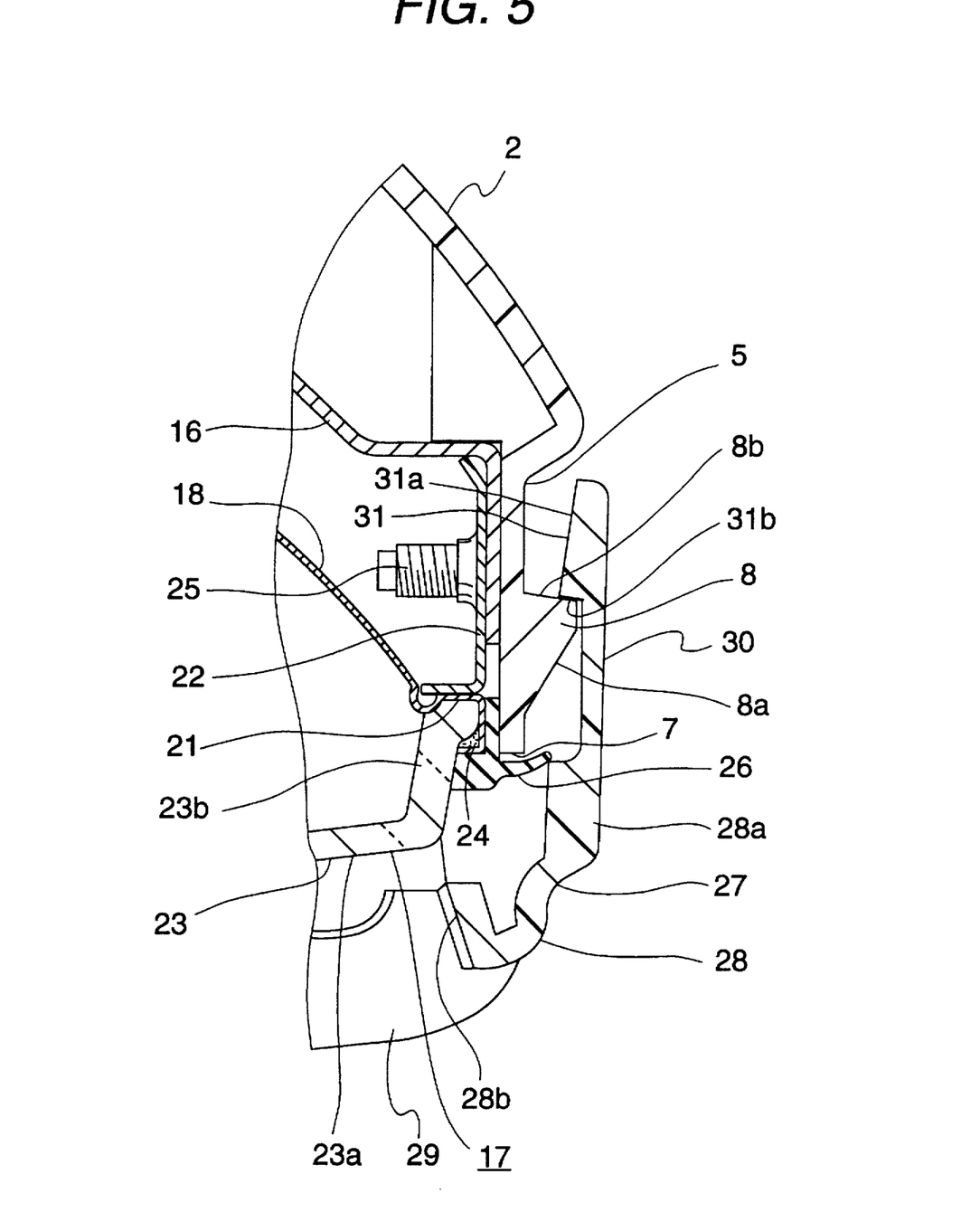
FIG. 5 is an enlarged sectional view taken on line V—V in FIG. 1.
Figure 6:
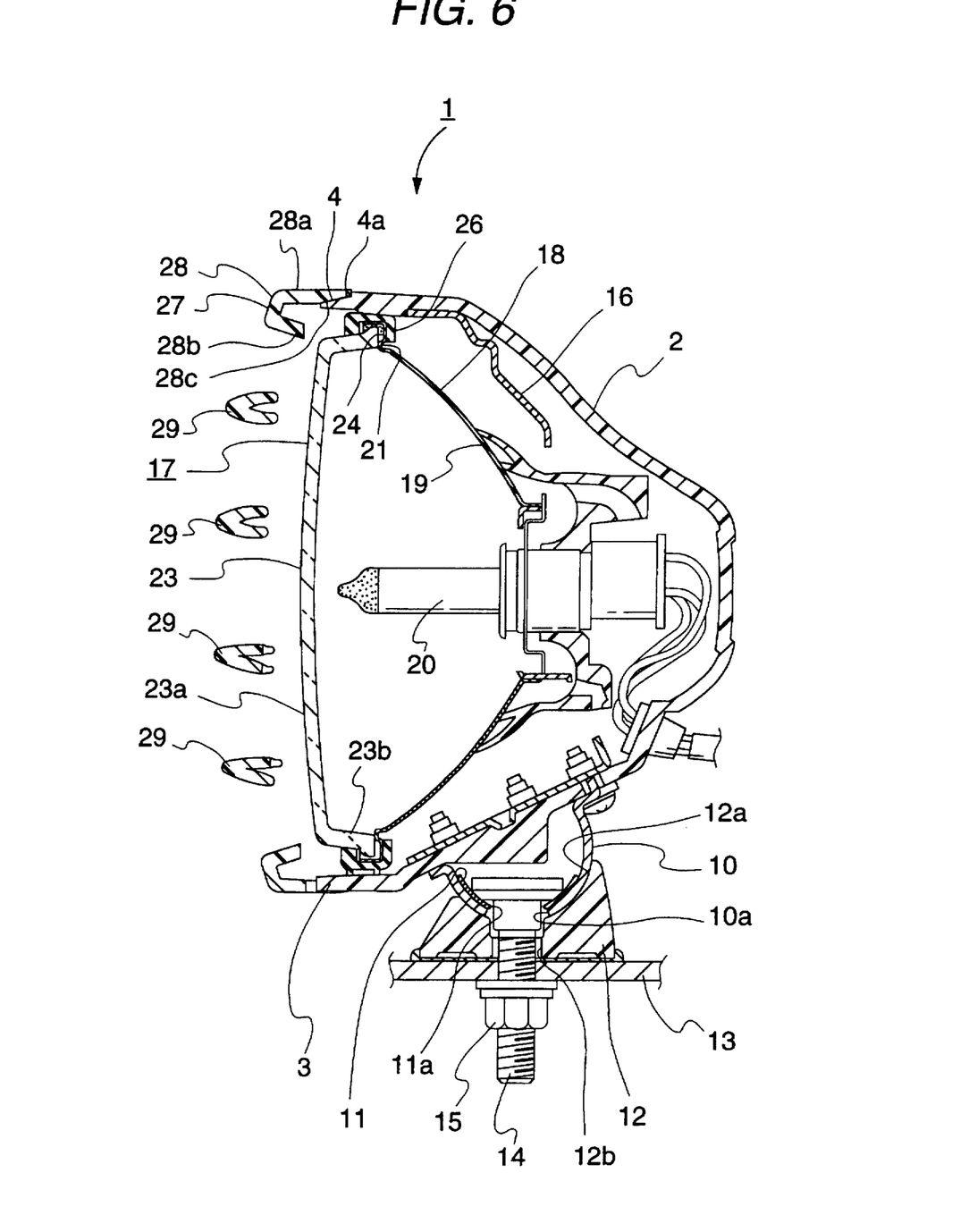
FIG. 6 is a sectional view taken on line VI—VI in FIG. 1.
Figure 7:
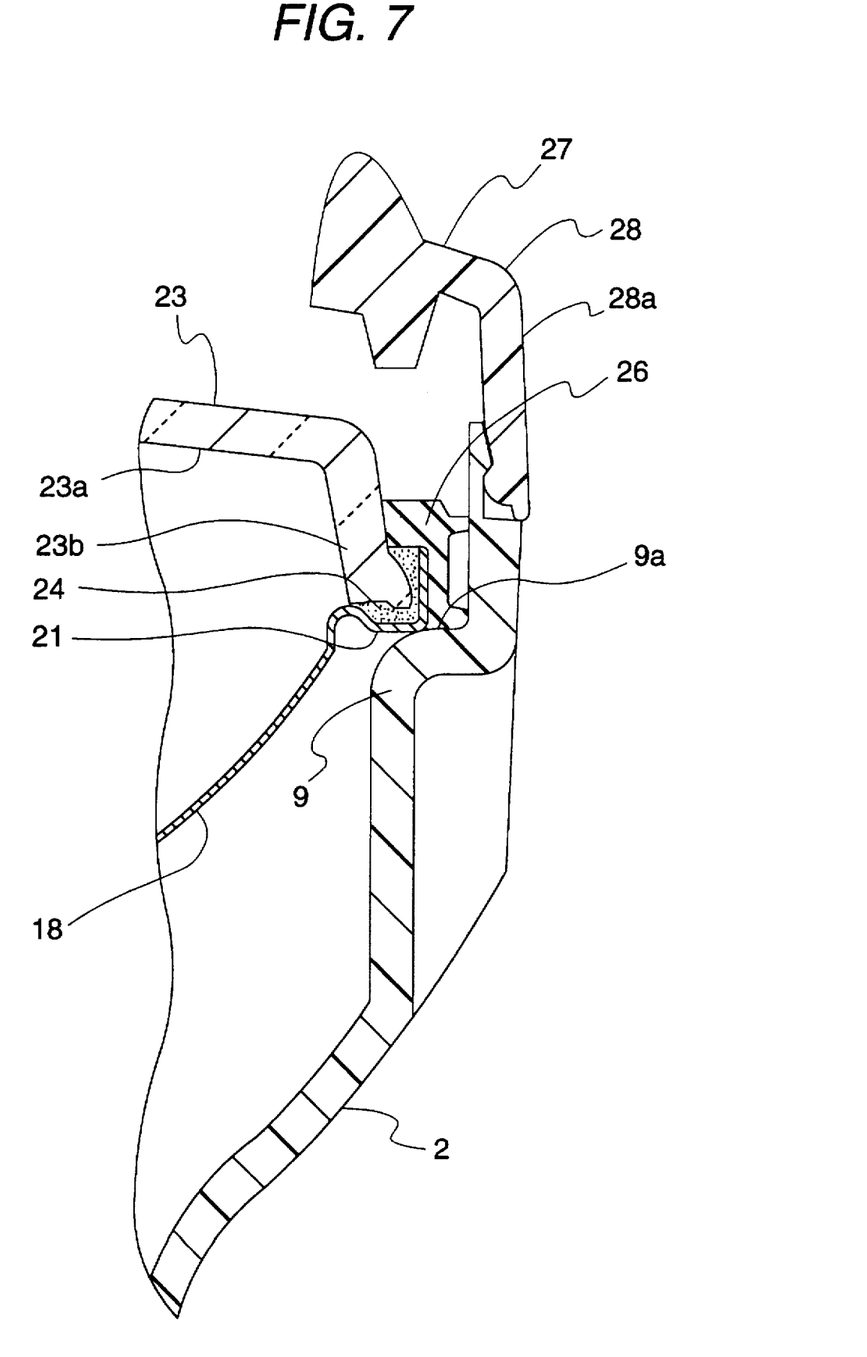
FIG. 7 is an enlarged sectional view taken on line VII—VII in FIG. 3.
Figure 8:
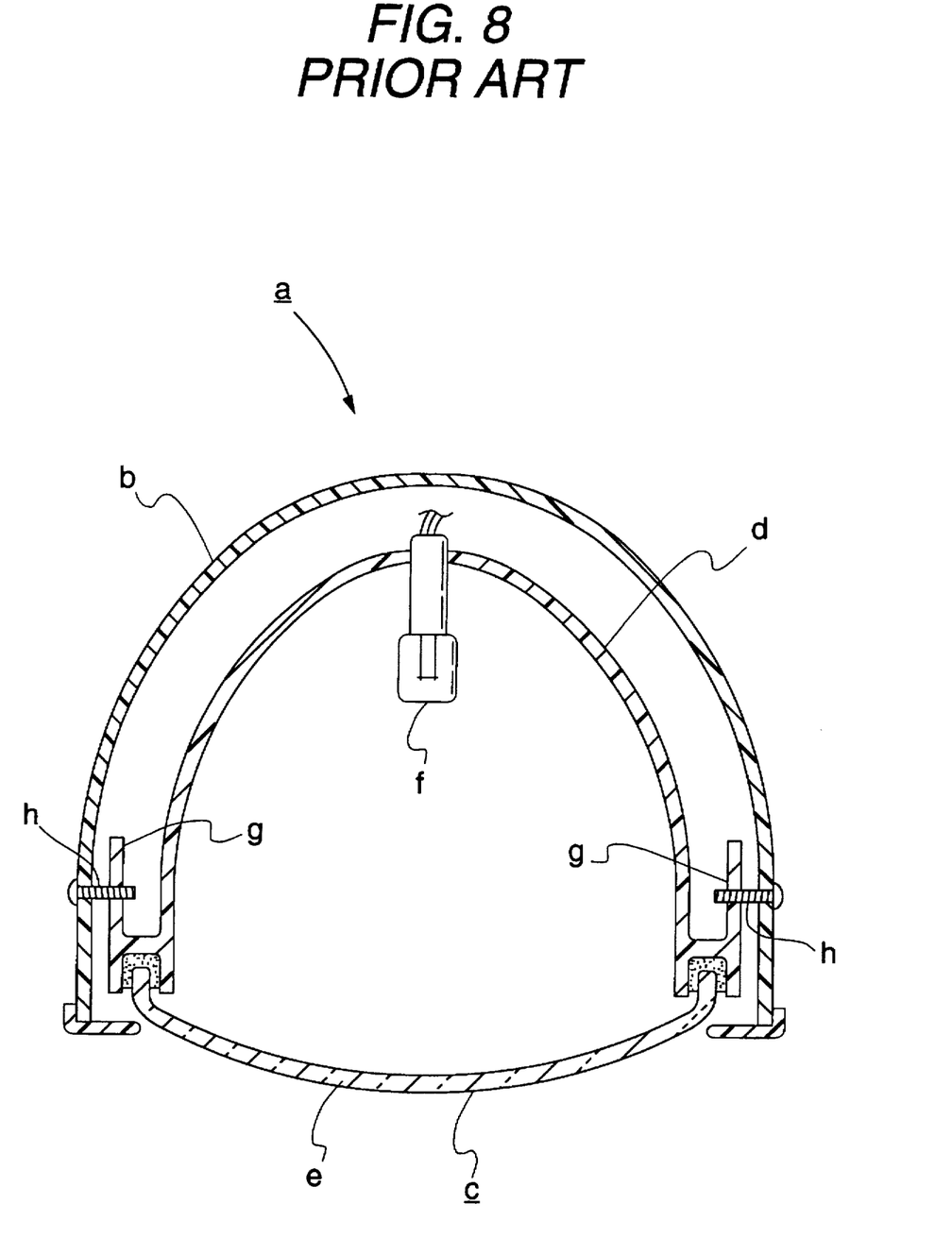
FIG. 8 is a horizontal sectional view showing an example of a conventional headlamp for motor vehicles.

A conventional headlamp a for motor vehicles is shown in FIG. 8.

A lamp body b has a container shape with an opening in the front end thereof. The lamp body b is mounted on a vehicle body.

A lamp unit c is supported within the lamp body b. The lamp unit c is made up of a reflector d the front end of which is opened, a lens e covering the front opening of the reflector d, and a light source bulb f disposed within a shell formed with the reflector d and the lens e. Mounting stays g are formed on both sides of the reflector d.

Mounting screws h are respectively inserted into the side portions on both sides of the lamp body b, and screwed into the mounting stays g of the lamp unit c. In this way, the lamp unit c is firmly supported within the lamp body b.

In the conventional headlamp thus constructed, the lamp unit c is supported by the lamp body b, using the mounting screws h. With this structure, when a force is applied to the lamp unit c from its front side, the force is concentrated on the mounting stays g. In an extreme case, the screws will be broken down.

SUMMARY OF THE INVENTION

An object of the present invention is to provide a headlamp for a vehicle in which a lamp unit is still secured if the external force is applied to the lamp unit from front side thereof.

To achieve the object, the present invention provides a headlamp for a vehicle including: a lamp unit including a reflector having a front opening, a lens covering the front opening of the reflector, and a light source bulb disposed within the shell formed with the reflector and the lens; and a lamp body supporting the lamp unit therein, the lamp body including an inward projecting portion, wherein the lamp unit abuts on the inward projection portion.

In the headlamp for motor vehicles thus constructed, when a force is applied to the lamp unit from its front side, the inward projecting portion of the lamp unit receives the force. As a result, the mounting screws will not be broken down. Provision of the inward curved portions improves the rigidity of the lamp body, and hence its durability.

DETAILED DESCRIPTION OF THE PREFERRED EMBODIMENTS

The preferred embodiment of a headlamp for motor vehicles according to the present invention will be described with reference to the accompanying drawings.

In FIGS. 1–7, reference numeral 1 designates an auxiliary headlamp for motor vehicles, for example, a spot lamp.

A lamp body 2 is shaped like a container having an opening in the front side thereof. The outer surface defining the circumferential edge of the front opening of the lamp body 2 includes a lower end portion 3 and a cut-out portion 4. The cutout portion 4 is gently inclined to the front thereof, to thereby form a tapered surface 4a.

Recessed portions 5 are formed on the outer surface of each of both sides of the lamp body 2, respectively. Each recessed portion 5 extends from the front end to the middle on each side of the lamp body 2. An insertion hole 6 is formed at the center on a rear end part of the recessed portion 5. A cutout 7, opened to the front, is located somewhat to the front of the insertion hole 6. Each recessed portion 5 includes a raised piece 8 vertically extending thereon. The raised piece 8 has a front face 8a gently tapered down to the front, and a rear face 8b, directed rearward, serving as an engaging face.

Above and below each recessed portion 5, inward projecting portions 9 are formed at the locations on the outer side of the lamp body, where are closer to the front end of the lamp body 2. The front face of each of the inward projecting portions 9 serves as a seat 9a, directed to the front. The seats 9a are flush with one another.

A mount base 10 is fixed to a portion on the lower surface of the lamp body 2, where is located closer to the rear end. The mount base 10, formed of metal plate, is hemispherical in shape. The mount base 10 has a relatively larger insertion hole 10a. A hemispherical attach plate 11 is formed of a metal plate. A curvature of the attach plate 11 is equal to that of the inner surface of the mount base 10. An insertion hole 11a is formed at the central part of the attach plate 11. The attach plate 11 is placed on the inner surface of the mount base 10.

A bracket 12 is fixed to a vehicle body 13. The bracket 12 has a substantially part spherical concavity 12a at the top thereof, and further includes an insertion hole 12b.

A set bolt 14 is inserted into the insertion hole 11a of the attach plate 11, the insertion hole 10a of the mount base 10, and the insertion hole 12b of the bracket 12 in this order, from the inside of the mount base 10. A nut 15 is screwed to a part of the set bolt 14, which is protruded to the rear side of the vehicle body 13, whereby the lamp body 2 is fastened to the vehicle body 13. The mount base 10 is sat in the substantially part spherical concavity 12a of the bracket 12. The insertion hole 10a is sufficiently larger than the diameter of the shaft of the set bolt 14. Accordingly, by loosening the nut 15, the outer surface of the mount base 10 slides along the inner surface of the substantially part spherical concavity 12a, where an angle of the lamp body 2 is adjusted.

A reinforcing ring 16 is formed of a metal plate, shaped like a ring, is disposed along, and fastened to the inner surface of the lamp body 2 by means of screws.

Reference numeral 17 stands for a lamp unit.

A reflector 18 includes a parabolically shaped recessed portion 19 directed to the front. A light source bulb 20 is attached to the central part thereof as shown. A mounting portion 21 is radially extended outward from the circumferential edge of the opening of the reflector 18. The mounting portion 21 is bent to the front, to thereby form a flat part. A pair of brackets 22 are provided. Each of the brackets 22 is arranged such that the front end is fixed to the rear end face of the mounting portion 21 of the reflector by means of fixing means, such as welding, the bracket is extended rearward, and a threaded hole 22a (22b) is formed in the mid portion of the bracket.

A lens 23 made of glass includes a front portion 23a covering the opening of the lamp unit 17, and a mounting portion 23b bent rearwardly of the circumferential edge of the front portion 23a. The rear end of the mounting portion 23b is bonded to the mounting portion 21 of the reflector 18 by adhesive 24.

The lamp unit 17 thus constructed is inserted into and firmly set in the lamp body 2 such that the rear end face of the mounting portion 21 is sat on the seats 9a of the inward projecting portions 9, mounting screws 25 are screwed into threaded holes 22a of the brackets 22, respectively.

A sheet packing 26, shaped like a ring, is made of elastic material, such as rubber. The sheet packing 26 is fit to the mounting portion 21 of the reflector 18 of the lamp unit 17, and in this state it is bonded thereto by quick adhesive. When the sheet packing 26 is thus supported by the lamp body 2, the sheet packing 26 intervenes between the mounting portion 21 of the lamp unit 17 and the inner surface of the lamp body 2, whereby it absorbs vibrations by vehicle running to the lamp body 2, thereby preventing it from being transmitted to the lamp unit 17.

A stone guard 27, a ring-like rim 28, and a plural number of guard members 29 are formed in one-piece construction. The rim 28, shaped like U in cross section, includes an outer part 28a and an inner part 28b shorter than the outer part 28a. The outer part 28a is more extended rearward than the inner part 28b. A rear part of the inner surface of the outer part 28a is upwardly slanted to form a tapered face 28c.

Mounting portions 30 are bent rearwardly of the rear ends of both sides of the outer part 28a of the rim 28, respectively. The rear end part of each of the mounting portions 30, which is continued from the thinned mid part thereof, serves as engaging pieces 31. The inner face of the engaging piece 31, designated by numeral 31a, is outwardly tapered. The lower end of the inner face 31a of the engaging piece 31 is stepped down to continue to the thinned mid part of the mounting portion 30. In the figure, the stepped down part or face of the lower end of the inner face 31a serves as an engaging face 31b.

The stone guard 27 is fastened to the lamp body 2 such that the rim 28, integral with the stone guard 27, is externally fit to the front end part of the lamp body 2. The rear end part of the outer part 28a of the rim 28 is made to engage the cutout portion 4, and the rear end thereof abuts on the rear end of the cutout portion 4, viz., it is positioned thereat. The rim 28 advances to the rear side while the inner faces 31a of the engaging pieces 31 of the mounting portions 30 urge the front faces 8a of the raised pieces 8 of the lamp body 2. As just mentioned, the rear end part of the outer part 28a of the rim 28 is made to engage the cutout portion 4, and the rear end thereof abuts on the rear end of the cutout portion 4, thereby being positioned thereat. At this time, the lower end faces 31b of the engaging pieces 31 come into contact with the rear faces 8b of the raised pieces 8. In this way, the stone guard 27 is mounted on the front end part of the lamp body 2.

In the spot lamp 1 thus constructed, the rear end face of the mounting portion 21 of the lamp unit 17 is sat on the seats 9a of the inward projecting portions 9, which extend inwardly of the inner surface of the lamp body 2. With this structure, when a force is applied to the lamp unit 17 from its front side, the force is received by the inward projecting portions 9. As a result, only a small percentage of the force acts on the mounting screws 25 that fasten the lamp unit 17 to the amp body 2, whereby the mounting screws 25 are protected.

Thus, provision of the inward projecting portions 9 improves the rigidity of the lamp body 2 per se, and hence its durability.

As seen from the foregoing description, the present invention improves a headlamp in which a lamp unit, which includes a reflector, a lens covering the front opening of the reflector, and a light source bulb disposed within a shell formed with the reflector and the lens, is supported within a lamp body, such that the lamp body includes inward curved portions, and the lamp unit is supported by and fastened to the lamp body by means of mounting screws in a state that the rear end face of the mounting portion formed along the front end of the reflector abuts on the inward curved portions.

With this construction, when a force is applied to the lamp unit from its front side, the inward curved portions of the lamp unit receives the force. As a result, the mounting screws will not be broken down. Provision of the inward curved portions improves the rigidity of the lamp body, and hence its durability. It is to be understood that the present invention is not limited in its application to the details of construction and arrangement of parts illustrated in the accompanying drawings, and that the invention may variously be modified, changed and altered within the spirit or scope of the claim.

What is claimed is:

1. A headlamp for a vehicle comprising:

a lamp unit including, a reflector having a front opening, a lens covering said front opening of said reflector, and a light source bulb disposed within a shell formed with said reflector and said lens; and a lamp body supporting said lamp unit therein, said lamp body including an inward projecting portion between said lamp body and said lamp unit, wherein said inward projecting portion is formed by inwardly recessing said lamp body and said lamp unit abuts on said inward projecting portion to allow said inward projecting portion to receive a force applied to a front side of said lamp unit.

2. A headlamp according to claim 4 wherein said inward projecting portion comprises a plurality of projections projecting inwardly from said lamp body.

3. A headlamp according to claim 2, wherein said reflector includes a mounting portion along said opening thereof, said mounting portion abutting on said projections of said lamp body.

4. A headlamp according to claim 1, further comprising:

means for securing said lamp unit with said lamp body.

5. A headlamp according to claim 4, wherein said securing means comprises:

a screw-receiving member formed on said lamp body, said screw-receiving member having an insertion hole;

a mounting portion provided with said lamp unit, said mounting portion having a threaded hole; and a screw inserted into said insertion hole of said screw-receiving member and said thread hole of said mounting portion.

6. A headlamp for a vehicle comprising:

a lamp unit including,
- a reflector having a front opening, said reflector including a mounting portion along said opening thereof,
- a lens covering said from opening of said reflector, and
- a light source bulb disposed within a shell formed with said reflector and said lens;

a lamp body supporting said lamp unit therein, said lamp body including an inward projecting portion between said lamp body and said lamp unit, wherein said mounting portion of said reflector abuts on said inward projecting portion to allow said inward projecting portion to receive a force applied to a front side of said lamp unit; and a sheet packing having a ring shape, said sheet packing being disposed between said mounting portion and an inner surface of said lamp body.

7. A headlamp for a vehicle comprising:

a lamp unit including,
- a reflector having a front opening,
- a lens covering said front opening of said reflector, and
- a light source bulb disposed within a shell formed with said reflector and said lens;

a lamp body supporting said lamp unit therein, said lamp body including an inward projecting portion between said lamp body and said lamp unit, wherein said lamp unit abuts on said inward projecting portion to allow said inward projecting portion to receive a force applied to a front side of said lamp unit; and means for securing said lamp unit with said lamp body, wherein said securing means comprises:
- a screw-receiving member formed on said lamp body, said screw-receiving member having an insertion hole,
- a mounting portion provided along said opening of said reflector,
- a bracket secured to said mounting portion, said bracket having a threaded hole, a reinforcing ring positioned between said lamp body and said bracket, and a screw inserted into said insertion hole of said screw-receiving member and said threaded hole of said bracket.

8. A headlamp for a vehicle comprising:

a lamp unit including,
- a reflector having a from opening,
- a lens covering said front opening of said reflector, and
- a light source bulb disposed within a shell formed with said reflector and said lens; and a lamp body supporting said lamp unit therein, said lamp body including an inward projecting portion formed between said lamp body and a back side of said lamp unit, wherein said inward projecting portion is formed by inwardly recessing said lamp body.

* * * * *

UNITED STATES PATENT AND TRADEMARK OFFICE
CERTIFICATE OF CORRECTION

PATENT NO. : 5,618,098
DATED : April 8, 1997
INVENTOR(S) : Naganawa et al.

It is certified that error appears in the above-identified patent and that said Letters Patent is hereby corrected as shown below:

Column 4, line 55, change "claim 4" to --claim 1--.

Column 5, line 10, change "from" to --front--.

Column 6, line 22, change "from" to --front--.

Signed and Sealed this

Twenty-ninth Day of December, 1998

*Attest:*

BRUCE LEHMAN

*Attesting Officer*  *Commissioner of Patents and Trademarks*